(12) United States Patent
Luppold et al.

(10) Patent No.: US 8,975,561 B2
(45) Date of Patent: Mar. 10, 2015

(54) ELECTRIC HEATING APPARATUS, ESPECIALLY FOR MOTOR VEHICLES

(75) Inventors: Michael Luppold, Dettenheim-Lie (DE); Alexander Dauth, Maulbronn (DE); Hans-Peter Etzkorn, Bruchsal (DE); Rolf Merte, Wiesloch (DE); Frank Bartmann, Hambrücken (DE); Stefan Brosig, Kirrweiler (DE); Norbert Ernst, Billigheim-Ingenheim (DE); Stephan Dick, Niederstaufenbach (DE); Christian Dörrie, Herxheim (DE)

(73) Assignee: BorgWarner BERU Systems GmbH, Ludwigsburg (DE)

( * ) Notice: Subject to any disclaimer, the term of this patent is extended or adjusted under 35 U.S.C. 154(b) by 1783 days.

(21) Appl. No.: 11/992,981

(22) PCT Filed: Dec. 14, 2006

(86) PCT No.: PCT/EP2006/012026
§ 371 (c)(1),
(2), (4) Date: Apr. 2, 2008

(87) PCT Pub. No.: WO2007/071335
PCT Pub. Date: Jun. 28, 2007

(65) Prior Publication Data
US 2009/0139983 A1  Jun. 4, 2009

(30) Foreign Application Priority Data

Dec. 20, 2005 (DE) .......... 10 2005 061 303
Apr. 20, 2006 (DE) .......... 10 2006 018 784
Nov. 22, 2006 (DE) .......... 10 2006 055 865

(51) Int. Cl.
*H05B 3/42* (2006.01)
*F24H 3/04* (2006.01)
(Continued)

(52) U.S. Cl.
CPC .......... *F24H 3/0405* (2013.01); *B60H 1/2225* (2013.01); *F24H 3/0429* (2013.01);
(Continued)

(58) Field of Classification Search
USPC ......... 219/230, 201, 202, 205, 206, 207, 208; 392/347, 360
See application file for complete search history.

(56) References Cited

U.S. PATENT DOCUMENTS 4,822,980 A * 4/1989 Carbone et al. .............. 392/453
4,931,626 A * 6/1990 Shikama et al. .............. 219/540
(Continued)

FOREIGN PATENT DOCUMENTS

DE     30 47 062 A1    7/1982
DE     39 42 266 C1    3/1991
(Continued)

*Primary Examiner* — Shawntina Fuqua
(74) *Attorney, Agent, or Firm* — Hackler Daghighian & Martino

(57) ABSTRACT

The invention describes a heating apparatus comprising at least one heater (9) in which one or more electric heating elements (11) are arranged, and at least one heat transmitter (1), which is connected with the at least one heater (9), comprises heat transmitter surfaces and is formed from an extruded profile (1*a*, 28, 28*a*) in which the at least one heater (9) is fitted,
in which at least part of the walls (6, 22, 22*a*) of the extruded profile (1*a*), which are not in contact with a heating element (11), is provided with openings through which a gaseous or liquid medium can flow through the extruded profile (1*a*, 28, 28*a*) in transverse direction to the direction of extrusion (17).

26 Claims, 19 Drawing Sheets

(51) Int. Cl.
  *B60H 1/22* (2006.01)
  *F24H 9/18* (2006.01)
  *F24D 13/00* (2006.01)

(52) U.S. Cl.
  CPC ............ *F24H3/0435* (2013.01); *F24H 3/0441* (2013.01); *F24H 3/0447* (2013.01); *F24H 3/0452* (2013.01); *F24H 9/1872* (2013.01); *B60H 2001/2271* (2013.01)
  USPC ............................ 219/230; 219/201; 392/347

(56) References Cited

U.S. PATENT DOCUMENTS

| | | | | |
|---|---|---|---|---|
| 4,954,692 A | * | 9/1990 | Shikama et al. | 219/540 |
| 4,963,716 A | * | 10/1990 | Van Den Elst et al. | 219/202 |
| 5,057,672 A | * | 10/1991 | Bohlender et al. | 219/540 |
| 5,192,853 A | * | 3/1993 | Yeh | 219/540 |
| 5,239,163 A | * | 8/1993 | Brouwers | 219/202 |
| 5,377,298 A | * | 12/1994 | Yang | 392/360 |
| 5,471,034 A | * | 11/1995 | Kawate et al. | 219/485 |
| 5,562,844 A | * | 10/1996 | Bohlender et al. | 219/540 |
| 5,665,261 A | * | 9/1997 | Damsohn et al. | 219/504 |
| 6,180,930 B1 | | 1/2001 | Wu | |
| 6,392,207 B2 | * | 5/2002 | Beetz et al. | 219/530 |
| 6,810,203 B2 | * | 10/2004 | Alban et al. | 392/347 |
| 6,875,962 B2 | | 4/2005 | Uhl et al. | |
| 2003/0160043 A1 | * | 8/2003 | Clemens | 219/530 |
| 2003/0180033 A1 | * | 9/2003 | Alban et al. | 392/347 |
| 2005/0230377 A1 | | 10/2005 | Bohlender et al. | |

FOREIGN PATENT DOCUMENTS

| | | |
|---|---|---|
| DE | 196 04 218 C2 | 3/1998 |
| DE | 201 08 843 U1 | 11/2001 |
| EP | 0 464 955 A1 | 1/1992 |
| EP | 1 370 117 A2 | 12/2003 |
| EP | 1370117 * | 12/2003 |
| EP | 1 731 852 A1 | 12/2006 |
| GM | 79 12 211 U1 | 7/1979 |

* cited by examiner

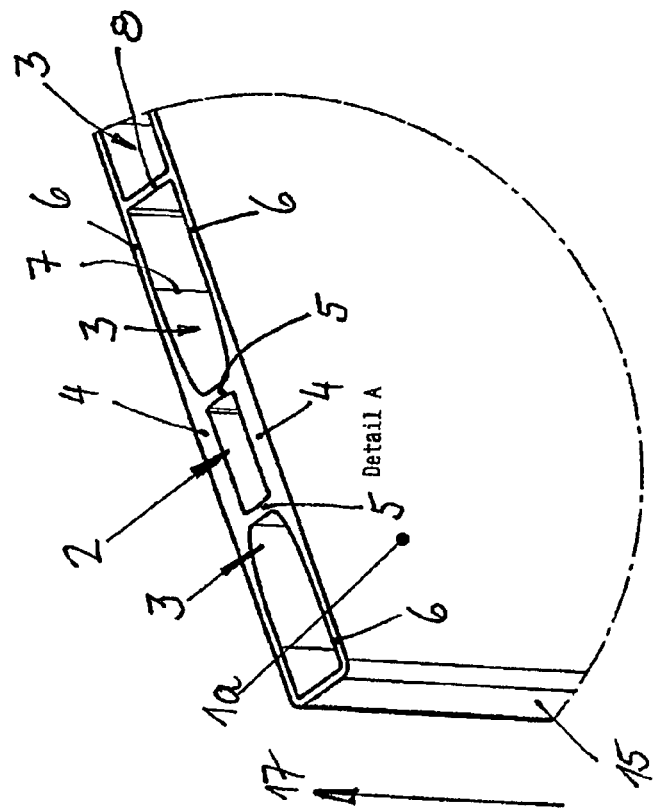
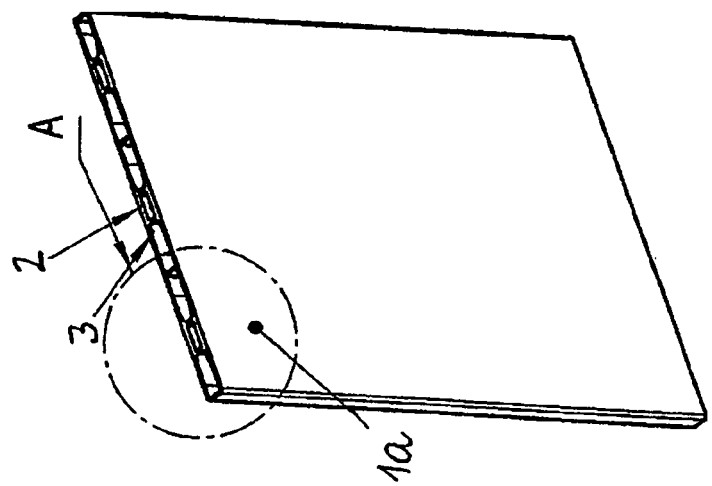
Fig. 2a
Fig. 2

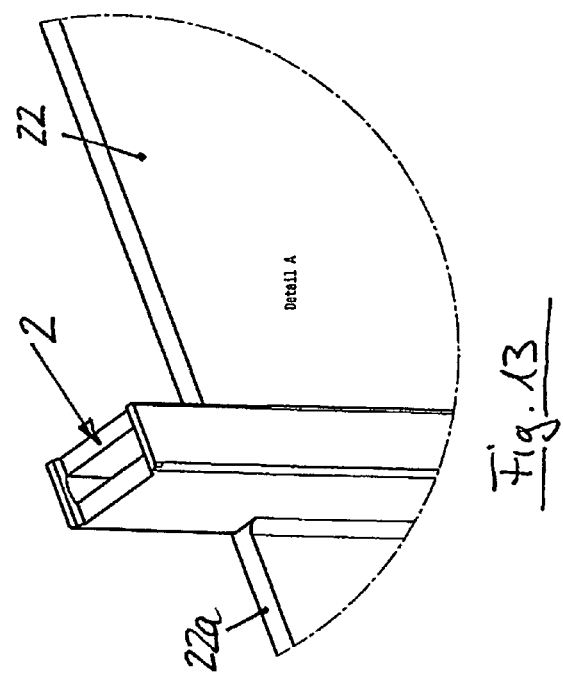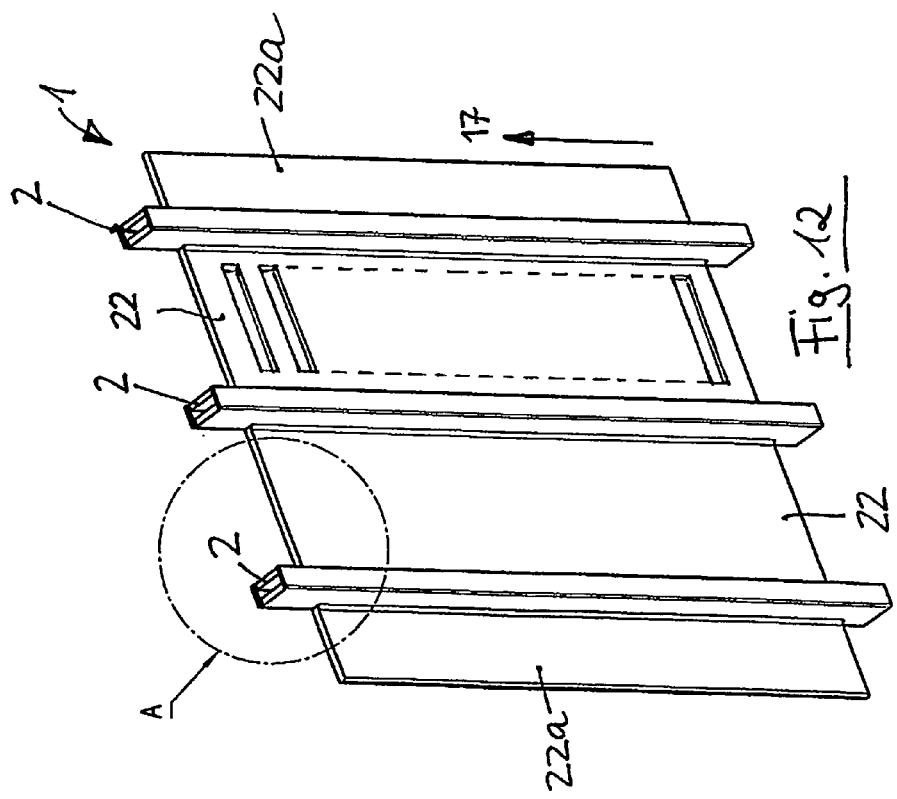

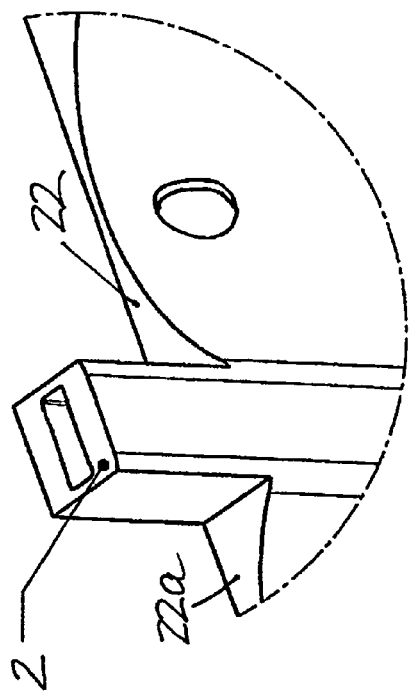
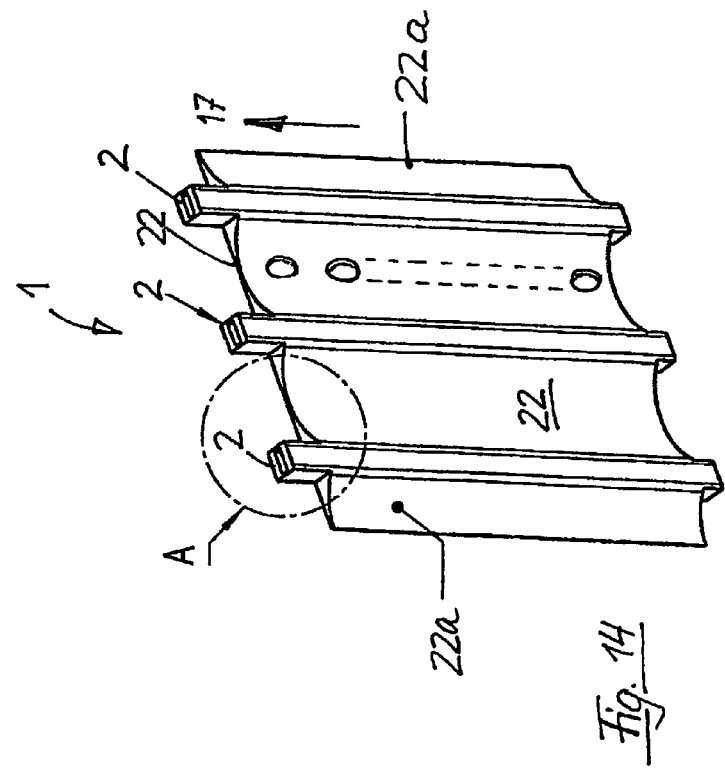

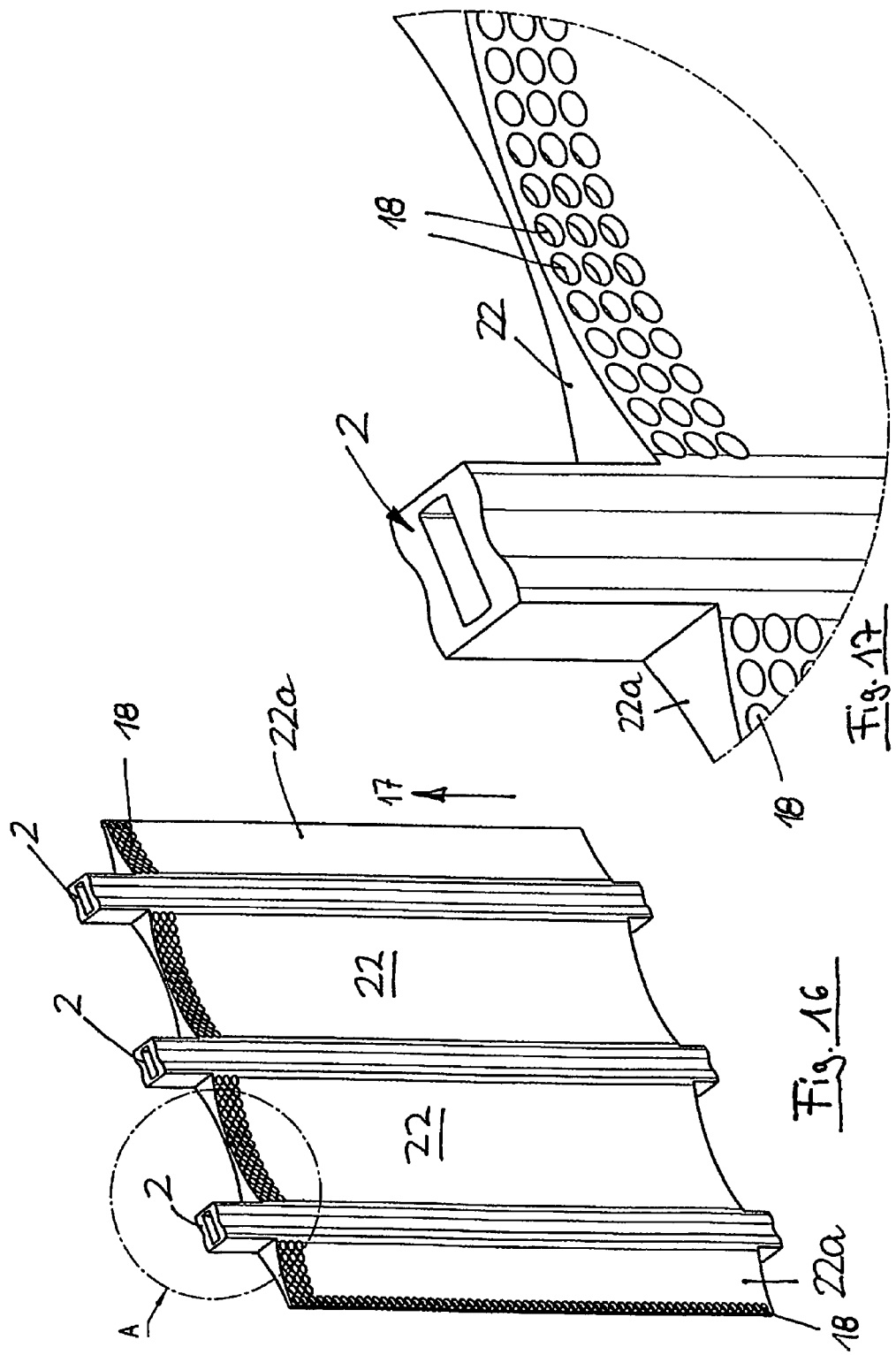

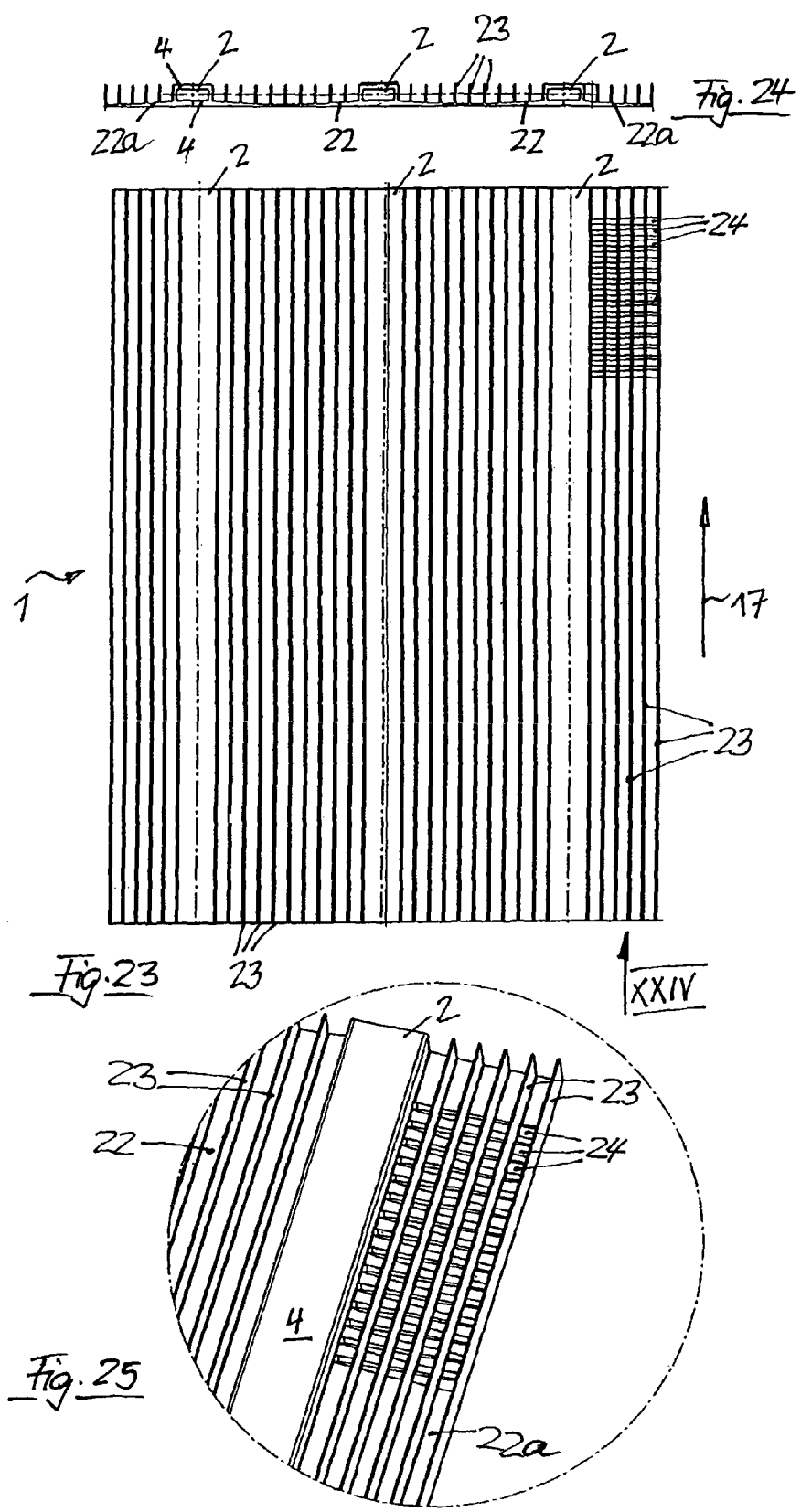

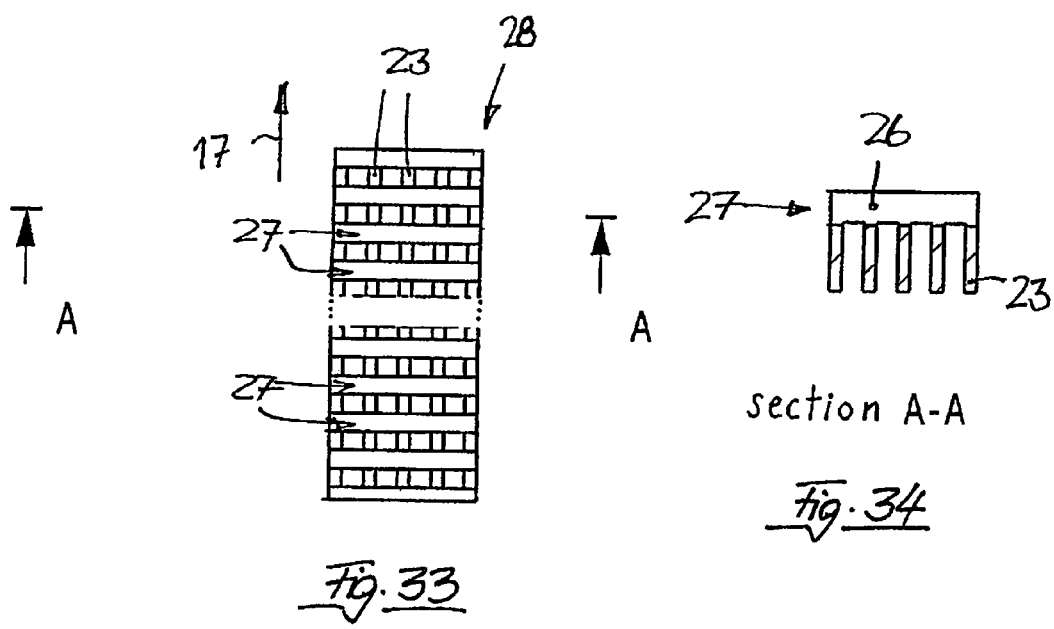
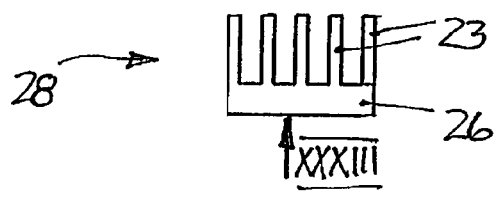

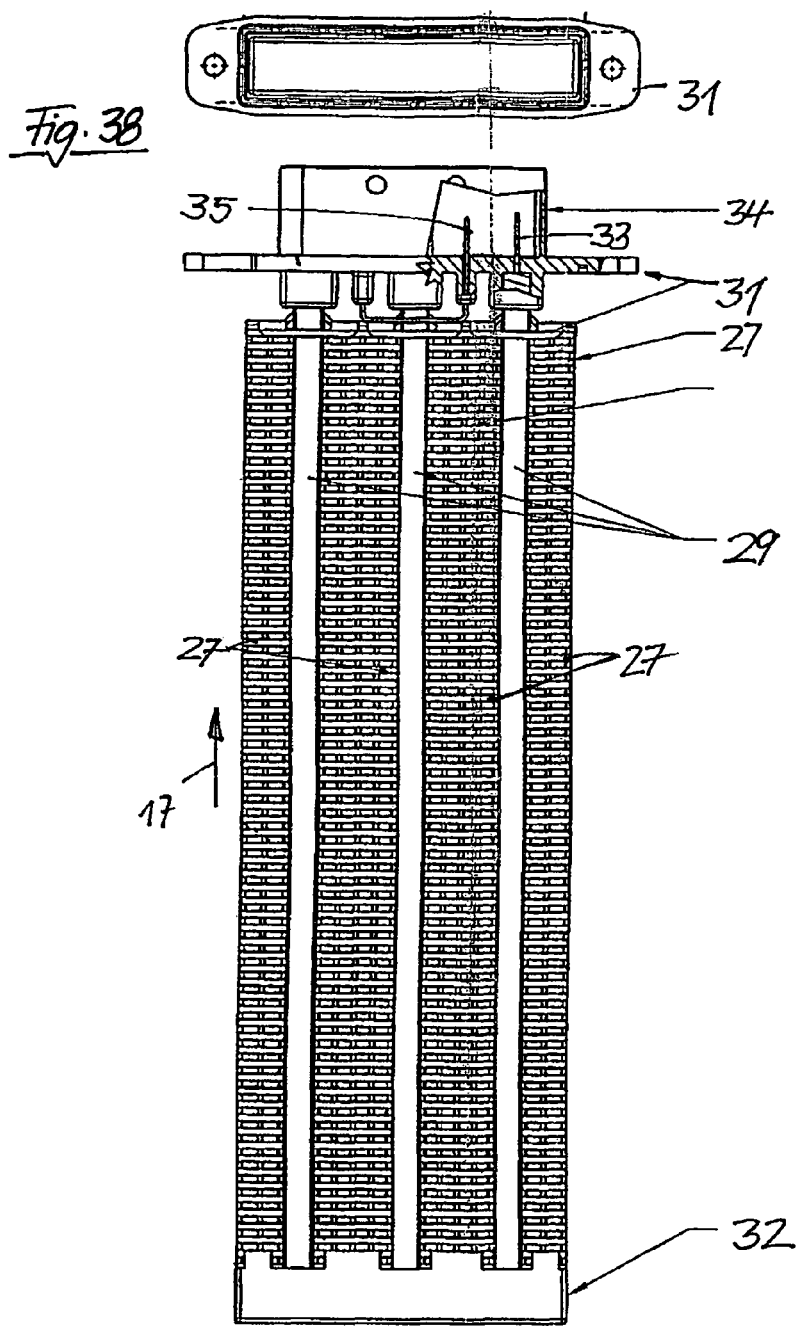
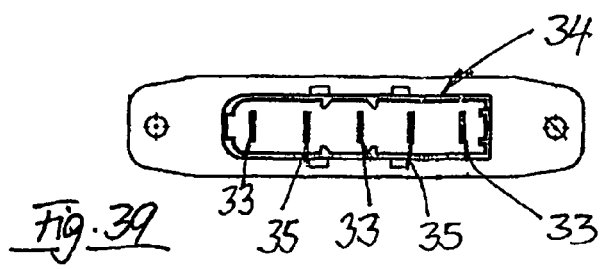

ELECTRIC HEATING APPARATUS, ESPECIALLY FOR MOTOR VEHICLES

The known heating apparatus (see DE 101 02 671 A1) comprises a plurality of heating rods arranged one parallel to the other that are filled with PTC heating elements. A plurality of fin-shaped plates is slid as heat transmitters onto the heating rods and is clamped on them thereby connecting the heating rods one with the other. An electric connection line is brought out from one end of the heating rods and is connected with the PTC heating elements. The housing of each of the heating rods serves as electric ground connection of the PTC elements.

The known heating apparatus has several disadvantages: Production of the heating apparatus requires many separate steps. The PTC elements are fitted in the heating rods which are then pressed together in order to produce satisfactory thermal con-duction between the PTC elements and the housing of the heating rods. The fins are punched out from sheet metal and are slid onto the heating rods each separately. The mechanical and heat-conducting connection between the fins and the heating rods is assured by clamping. The heat transfer from the heating rods to the fins is therefore limited by the small size of the contact areas between the fins and the housing of the heating rods. In the case disclosed in DE 101 02 671 A1, the medium to which the heat generated by the PTC heating elements is to be transferred is air that is to heat the interior of a motor vehicle. The air flows through the heating apparatus, transversely to the heating rods and tangentially to the fins. Heat transfer is not very effective in the case of the known heating apparatus. In order to still be able to transfer the desired thermal output, many fins are arranged on the heating rods in close succession, which makes the production process expensive.

EP 1 370 117 A2 discloses an electric heating apparatus with PTC heating elements for heating the interior of motor vehicles, where the heat exchanger, instead of being formed by a plurality of separate fins, is produced from extruded profile sections obtained by transverse separation of an extruded profile that comprises a great number of chambers which latter are separated one from the other by thin walls. Several identical extruded profile sections are arranged one beside the other in a direction perpendicular to the direction of extrusion. The PTC heating elements extend between pairs of two adjacent extruded profile sections and are fixed in that position by the fact that the extruded profile sections are clamped in a common frame so as to form a single unit. The air to which the heat produced by the PTC heating elements is to be transferred flows through the extruded profile sections in the direction of extrusion, tangentially to the surfaces of the many chambers formed in the extruded profile sections. Although the assembly input required for the heat exchanger is lower for the heating apparatus known from EP 1 370 117 A2 than in the case of DE 101 02 671 A1, the heat transfer efficiency is not better than in the case of DE 101 02 671 A1. Moreover, the PTC heating elements, their supply lines and their electric contact areas are exposed to the influence of the air to which their heat is to be transferred, which results in corrosion and increased transition resistances.

DE 201 08 843 U1 describes a heating apparatus for heating up or warming food or beverages, especially a hot plate of a coffeemaker, which comprises a plate in which two hollow chambers are integrated for receiving PTC elements. The plate with the integrated hollow chambers is designed as an extruded profile.

Now, it is the object of the present invention, for an electric heating apparatus of the before-described type, to improve the input requirements for production and heat transfer.

SUMMARY OF THE INVENTION

That object is achieved by a heating apparatus having the features specified in the claims. Advantageous further developments of the invention are the subject-matter of the sub-claims.

In the case of the heating apparatus according to the invention, the heat exchanger consists of one or more extruded profiles in which one or more heaters are fitted. At least part of the walls of the one or more extruded profiles, which are not in contact with a heating element, is provided with openings through which a gaseous or liquid medium can flow through the extruded profile in transverse direction, preferably at a right angle to the direction of extrusion. This arrangement provides advantages:

In order to achieve high heat output, it is favorable not only to provide the heat exchanger with a relatively large surface acting as heat exchanger surface, but especially to provide the surface of the extruded profile with openings, at least in places where the walls of the profile are not in contact with a heating element so that the medium to which the heat is to be transferred can flow through the extruded profile transversely to the direction of extrusion. This provides the advantage that a strong vortex motion can be produced, and this especially when the walls of the extruded profiles are provided with slits and the wall portions that are delimited by the slits are bent off the plane of the respective wall. It is thereby possible to produce baffles, fins, tongues grid-like structures, or the like, which is especially favorable with respect to the formation of vortexes and, thus, for achieving efficient heat transfer. Preferably, the wall portions delimited by the slits are bent into the interior of the extruded profile where they will not be disturbing in any way. The bent-off material does not constitute waste, but is effectively utilized for the heat exchange.

Cut-out holes and inwardly bent wall portions can also be combined with advantage. By properly selecting the form and arrangement of the openings and slits it is possible to adapt the pressure loss of the flow within wide limits to the particular application.

The holes, slits and inwardly bent fins, tongues, baffles, and the like, can be produced by a single operation, by a combined punching and bending tool. If a progressive die is used, it is even possible, in one and the same operation, to impress the extruded profile in the areas where the heaters are located in order to press the heaters and the extruded profile together and to thereby not only fix those elements in place but also ensure efficient heat transfer between the heating elements and the extruded profile.

Another advantage of the invention is that by properly selecting the shape and height of the extruded profile, the clear width of the chambers of the extruded profile, the shape, size and distribution of the openings in the extruded profile, and the shape of the inwardly bent fins or tongues, the flow resistance and the heat transfer from the extruded profile to the medium flowing through it in crosswise direction can be optimized for the respective application. In the case of an extruded profile through which the medium flows in the direction of extrusion, such optimization is not possible.

The extruded profile may not only perform the function of a heat exchanger, but may simultaneously serve as a housing for the at least one heater. For this purpose, the extruded profile preferably comprises a separate hollow chamber for each heater, which when viewed transversely to the direction of extrusion is closed and accommodates a heating element or an arrangement of several heating elements. The ends of those hollow chambers can be hermetically sealed, for example using a sufficiently heat-resistant plastic material, preferably using a thermo-setting two-component plastic material, so that the heating elements and their electric contact areas are not exposed to the medium to which they are to transfer the heat. Heating apparatuses according to the invention are therefore also suitable for use in liquid media, for example for warming up diesel fuel. An additional advantage is the optimum heat flow from the housing of the heater to the heat transmitter in cases where the housing is an integral component of the heat transmitter.

However, there is also the possibility to prefabricate rod-shaped heaters with separate housings and to then fit them in a chamber of the extruded profile, which latter may be tight, but does not necessarily have to be tight.

A good heat-conducting connection between the heating elements and the extruded profile can be achieved without great expense by pressing the heaters or the heating elements and the extruded profile together.

The heating apparatus according to the invention is extraordinarily stable mechanically, without any need for a frame that would hold together the heaters and the heat exchanger.

The invention permits the number of separate parts required for the production of the heating apparatus to be drastically reduced. The at least one heat transmitter, formed from an extruded profile, preferably extends over the length of the heaters as far as these are equipped with heating elements. Contrary to the prior art, where a great number of fins have to be mounted on a heater, a single heat transmitter needs to be fitted in the case of the invention. An especially advantageous solution is achieved when a single heat transmitter is provided only for all of the heaters. This reduces the storekeeping requirements for components of the heating apparatus to a minimum. Moreover, the heating apparatus is given high mechanical stability. At the same time, dimensional tolerances are minimized, the dimensions being pre-dominantly defined by the extruded profile whose production process guarantees small dimensional tolerances. Variations between heating apparatuses of one series are drastically reduced in the case of the invention when compared with heating apparatuses of the prior art. The resulting quality improvement simultaneously reduces the quality assurance expense.

The reduction in the number of components of the heating apparatus leads to a reduction not only in assembly times but also in the costs of production tools required and, consequently, also in the costs of tool setting-up times.

As extruded profiles can be produced with the most different shapes and in the most various sizes, the outer shape of the heating apparatus can be flexibly adapted to the particular application.

The use of an extruded profile as a heat transmitter makes it easier to connect the entire surface of the device uniformly to ground potential.

The invention is suited for heating apparatuses comprising any desired number of heaters.

Configuring the housing of the heater as an integral component of the heat transmitter made from an extruded profile allows a higher power output to be achieved or, in case the output is predefined, the quantity of materials used in the production of the heat transmitter to be reduced.

If the heat transmitter does not simultaneously function as a housing for the at least one heater, but instead the heater is provided with a separate housing, then that housing need not be fitted in a hollow chamber of the heat transmitter that is fully closed all around, i.e. transversely to the direction of extrusion, viewed in cross-section, but may be fitted between internal ribs of the extruded profile, for example.

The solution where the heat transmitter is simultaneously employed as a housing for the at least one heater is, however, preferred so that no separate housing is needed for the heater, while the advantage that the heater can be mounted in a hermetically sealed space is preserved.

Preferably, the heater is an elongated subassembly which comprises a plurality of heating elements arranged along a straight line one behind the other, in the way known in the art. The heating elements can be supplied with current via a common conductor track that extends in lengthwise direction of the hollow chamber of the extruded profile and that is in contact with the heating elements. The circuit is preferably closed via the extruded profile which is connected to ground. The conductor track used for current supply must be insulated relative to the extruded profile. This may be effected by a strip of an electrically insulating material extending over the length of the extruded profile, or by coating the conductor track, except for the sup-porting surface for the PTC heating elements, with an insulating material. Preferably, that issue is solved by the use of PTC resistors as heating elements that are arranged in pairs one beside the other. In that case, the conductor track may extend between the PTC heating elements of each pair, which are both contacted by it, while being separated from the extruded profile by the PTC heating elements.

According to an advantageous further development of the heating apparatus, the extruded profile has further chambers, in addition to the hollow chambers for the heater, that extend in parallel to the hollow chambers. This gives the heating apparatus high mechanical stability.

According to another preferred further development of the heating apparatus, the hollow chambers for the heater are connected indirectly or directly by webs that do not contain any further chambers. That simplifies the structure of the heating apparatus and helps save material. The webs may project directly from the hollow chambers so that the latter are connected exclusively by webs that do not contain any further chambers. However, a further chamber, extending in parallel to the hollow chambers for the heater, may be provided at each transition from the hollow chambers for the heaters to the web. This then provides a smooth transition between the walls of the hollow chambers for the heater and the webs, which facilitates the transfer of heat. Regarding heat transfer from the heater in the hollow chambers to the webs, it is a further advantage if these are plano-concave or biconcave in cross-section. In that case, they may have approximately the same thickness as the hollow chambers, in the area where they foot on them, and may then become thinner as the distance from the hollow chamber increases, which saves material without obstructing the heat flow. Rather, such a cross-sectional shape permits a level temperature profile to be realized on the webs.

Preferably, the extruded profile extends beyond the hollow chambers for the heater on both sides, forming either another hollow chamber or merely a solid wall that gets thinner as the distance from the hollow chamber for the heater increases. Such a tapering wall can be used with advantage also for fitting the heating apparatus in two guide rails of U-shaped cross-section where they can be readily exchanged when mounted in the vehicle.

Preferably, the extruded profile has the greatest wall thickness in the area where it encloses at least one heater. This is favorable with respect to absorption of the heat generated by the heating elements. As the distance from the heater increases, the wall thickness of the extruded profile preferably is reduced because the heat that is to be transported decreases as the distance from the heater increases. Steady reduction of the wall thickness, related to the increasing distance from the heaters, is preferred.

In order to increase the heat transmitter surface, the walls or webs that connect hollow chambers or hollow chamber profiles extending in parallel one to the other are provided with webs which preferably extend at a right angle or nearly a right angle relative to the walls or the webs. Preferably, these ribs do not project beyond the planes that enclose the hollow chambers extending one beside the other. In an especially favorable embodiment, the height of the webs decreases as the spacing from the hollow chambers increases. This arrangement accounts for the fact that the quantity of heat, which flows through the heat transmitter in crosswise direction, decreases as the distance from the hollow chamber increases. Alternatively, or in supplementation, the surfaces that serve to effect the heat exchange may be roughened.

According to its function, namely to transfer heat, any highly heat-conducting material, preferably any highly heat-conducting metals, such as aluminum, copper or alloys of those metals, but also any highly heat-conducting ceramic material, are suited for the extruded profile.

The invention is especially well suited for electric auxiliary heatings in vehicles of all kinds.

BRIEF DESCRIPTION OF THE DRAWINGS

Some embodiments of the invention are illustrated in the attached drawings. Identical parts, or parts corresponding one to the other, are indicated by the same reference numerals in the different examples.

FIG. 2 shows an oblique view of an extruded hollow profile section, provided as heat transmitter in FIG. 1;

FIG. 2a shows the detail A from FIG. 2;

FIG. 12 shows an oblique view of a heater where hollow chambers that accommodate the heaters are connected by walls that do not contain any further hollow chambers;

FIG. 13 shows the detail A from FIG. 12;

FIG. 14 shows an oblique view of an example of a heater that has been modified relative to the heating apparatus shown in FIG. 12;

FIG. 15 shows the detail A from FIG. 14;

FIG. 16 shows an oblique view of a heater, which is similar to the heater shown in FIG. 14 but modified relative to the latter;

FIG. 17 shows the detail A from the heater illustrated in FIG. 16;

FIG. 23 shows a top view of one of the broad incident-flow sides of another heat transmitter where the hollow chambers that accommodate PTC heating elements, for example, are connected one with the other by a web only;

FIG. 24 shows the view XXIV on the end of the heat transmitter illustrated in FIG. 23;

FIG. 25 shows an oblique view of an enlarged detail from the top view according to FIG. 23;

FIG. 32 shows a view on one of the ends of an extruded heat transmitter profile;

FIG. 33 shows the top view XXXIII according to FIG. 32 on one of the broad sides of the heat transmitter profile;

FIG. 34 shows the section A-A according to FIG. 33;

FIG. 37 shows the top view of the broad side of the heating apparatus which is turned away from the observer in FIG. 35;

FIG. 38 shows a top view of the connector housing of the heating apparatus according to FIG. 37; and FIG. 39 shows a top view of the interior of the connector housing illustrated in FIGS. 37 and 38.

DETAILED DESCRIPTION

Figure 1:
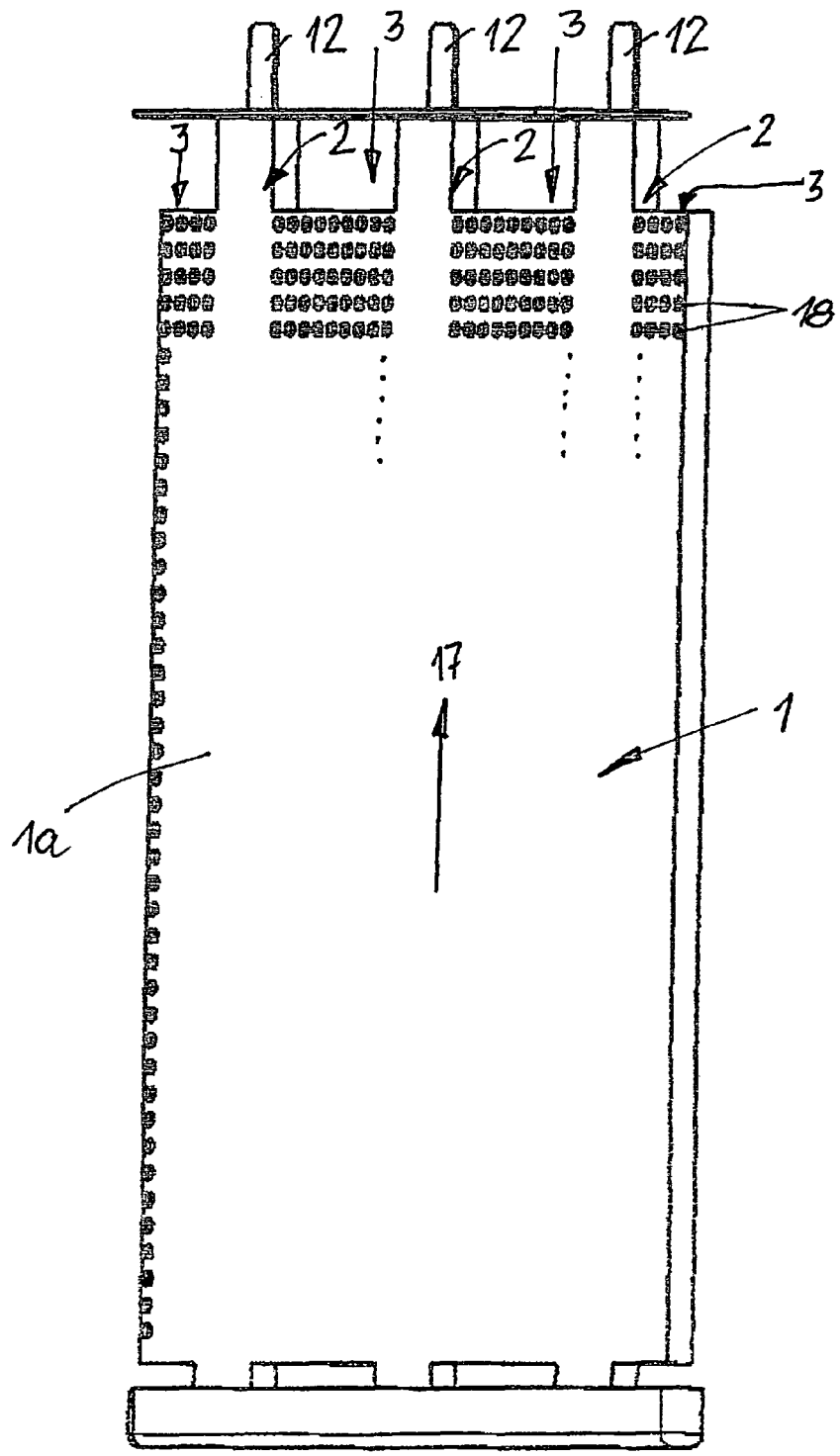
FIG. 1 shows a view of a heating apparatus according to the invention.

FIG. 1 shows a view of a heating apparatus having a single heat transmitter 1 made from an extruded profile 1a. The heat transmitter 1 is a flat structure having a plurality of hollow chambers 2 each of which comprises a heater from which an electric supply line 12 is brought out through one end of the hollow chamber 2 in electrically insulated fashion. Both ends of the hollow chamber 2 are sealed by a sufficiently heat-resistant plastic material, for example by a thermo-setting synthetic resin.

Adjoining both sides of each of the hollow chambers 2 is a further chamber 3 of the extruded profile 1a. However, the outer walls 6 of that chamber 3 are open, which will be described in more detail further below.

The hollow chambers 2 of the extruded profile 1a project a certain length beyond the further chambers 3, thereby facilitating attachment of an electric control unit on the one side and of a holder for installation of the heating apparatus on the other side.

FIG. 2 and the detail illustrated in FIG. 2a show an extruded profile 1a, made from a highly heat-conducting metal, for a heating apparatus according to the invention. The extruded profile 1*a* has a plurality of mutually parallel hollow chambers 2 of rectangular, closed cross-section, which are intended to receive oblong heaters 9. gular, closed cross-section, which are intended to receive oblong heaters 9. On both sides of each hollow chamber 2, the extruded profile 1*a* is provided with a further chamber 3 the clear cross-section of which is larger than the clear cross-section of the hollow chamber 2. The extruded profile 1*a* has the greatest wall thickness in the area where it forms the outer walls 4 of the hollow chambers 2. Starting from the inner walls 5 of the hollow chamber 2, the thickness of the outer walls 6 of the further chambers 3 steadily decreases up to a point 7 after which it remains constant up to the partition walls 8 that separate each pair of the further chambers 3.

Figure 3:
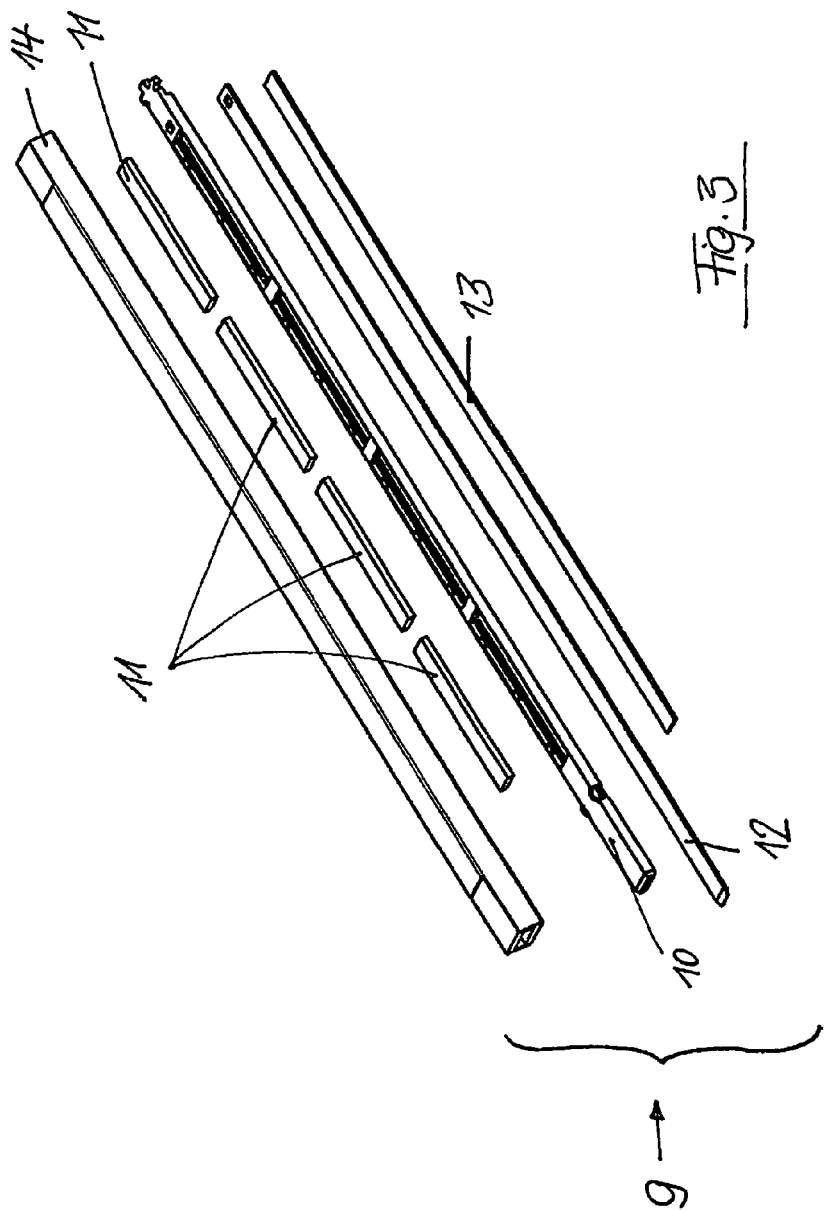
FIG. 3 shows in an oblique exploded view the structure of a rod-shaped heater.

FIG. 3 shows the structure of a rod-shaped heater 9. That heater comprises a mounting frame 10 which preferably consists of a sufficiently heat-resistant plastic material and which serves to accommodate a number of cuboid PTC heating elements 11. A supply line 12 is provided to electrically contact the PTC heating elements 11 on their one side. The supply line 12 consists, for example, of a tin-plated copper strip and is covered on its side opposite the PTC heating elements 11 by a strip-shaped insulator which preferably consists of a ceramic material, for example of aluminum oxide. The insulator 13, the supply line 12 and the mounting frame 10 with the heaters 11 are introduced into and fixed in a rod-shaped housing 14. The housing 14 is highly conductive electrically and is preferably made of aluminum or an aluminum alloy. The housing 14 contacts the side of the PTC heating elements 11 opposite the supply line 12, whereas the insulator 13 insulates the supply line 12 from the housing 14.

The heating rod 9 may be introduced into a chamber of the extruded profile 1*a*. Preferably, however, the separate housing 14 illustrated in FIG. 3 is omitted and the arrangement comprising the PTC heating elements 11, the mounting frame 10, the conductor track 12 and the insulator 13 is directly fitted and fixed in the hollow chamber 2 of the extruded profile 1*a*. Fixing is effected most simply by pressing, i.e. by exerting a pressure on the two outer walls 4 of the hollow chamber 2 whereby the outer walls 4 are permanently deformed so that the heater 9 is fixed in place and in addition a highly heat-conducting connection is achieved between the heaters 11 and the extruded profile 1*a*. Preferably, pressing is effected over the full length of the extruded profile 1*a*.

Figure 4:
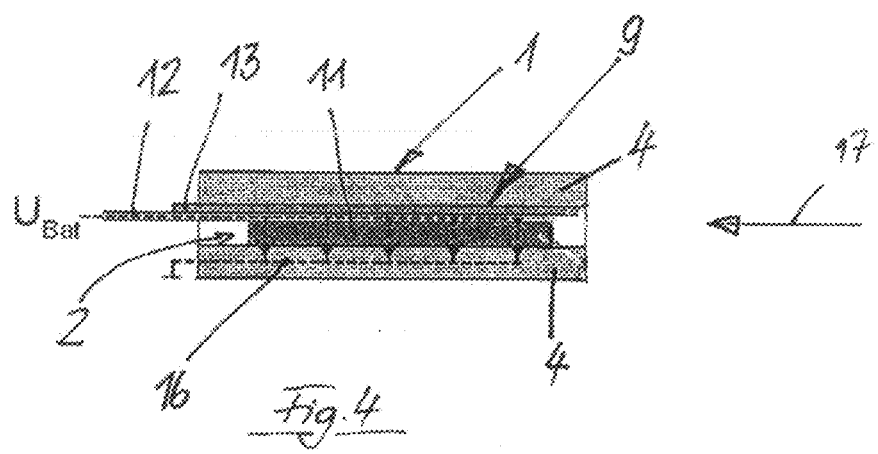
FIG. 4 shows a longitudinal section through part of the heating apparatus.

FIG. 4 shows a longitudinal section through a portion of the heating apparatus according to the invention with a heater 9 which—except for the housing 14—comprises the components illustrated in FIG. 3 although the mounting frame 10 is not been shown for reasons of clarity. The broken line 16 indicates the flow of current from a terminal of the battery having the voltage $U_{BAT}$ against the ground potential present on the surface of the heat transmitter 1.

Figure 5:
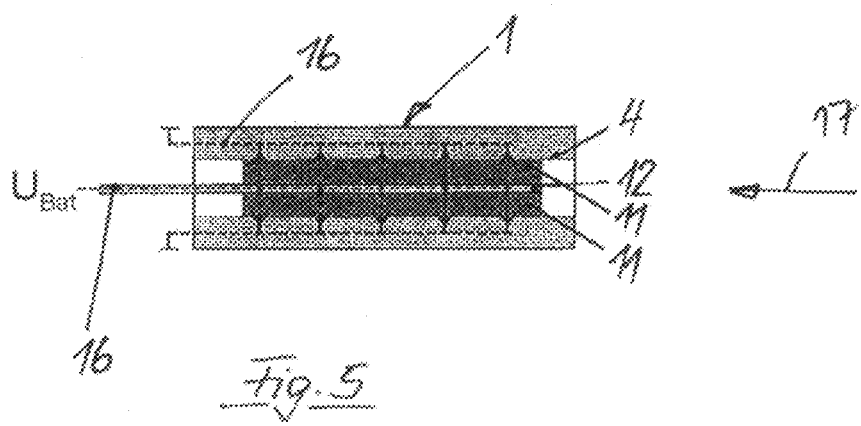
FIG. 5 shows a longitudinal section corresponding to FIG. 4, through a modified heating apparatus.

FIG. 5 shows a modification of the example illustrated in FIG. 4 insofar as pairs of PTC heating elements 11 are provided with the supply line 12 clamped between them. That embodiment provides the advantage that no insulator 13 is needed and that a higher heating power, related to the unit of length of the heater 9, can be generated.

Figure 6:
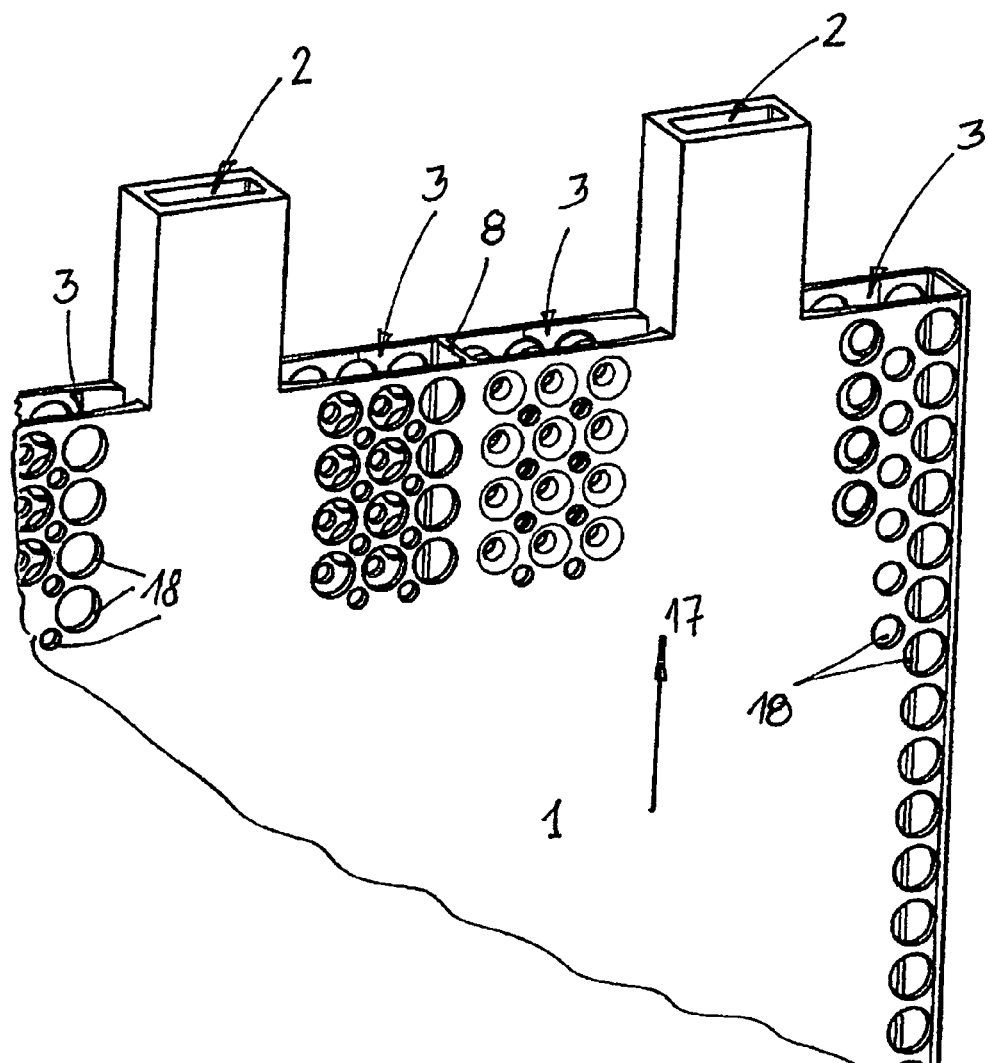
FIGS. 6 to 11 show sections of differently designed heat transmitter surfaces of extruded profiles.
Figure 7:
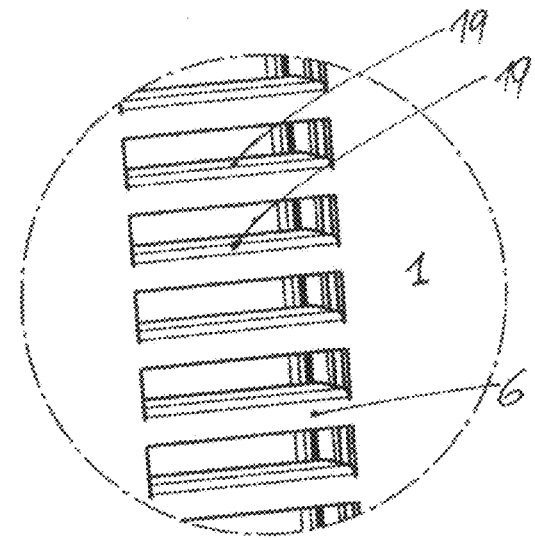
Figure 8:
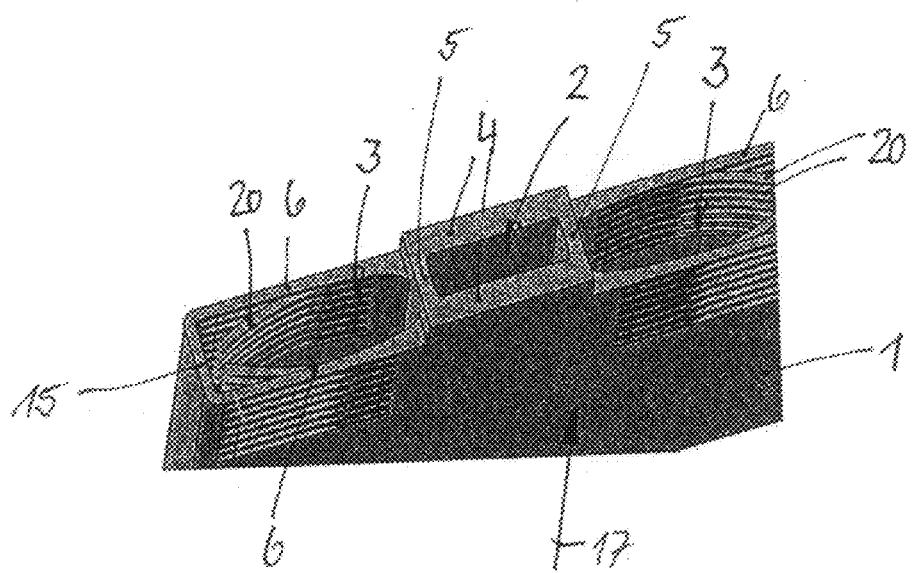
Figure 11:
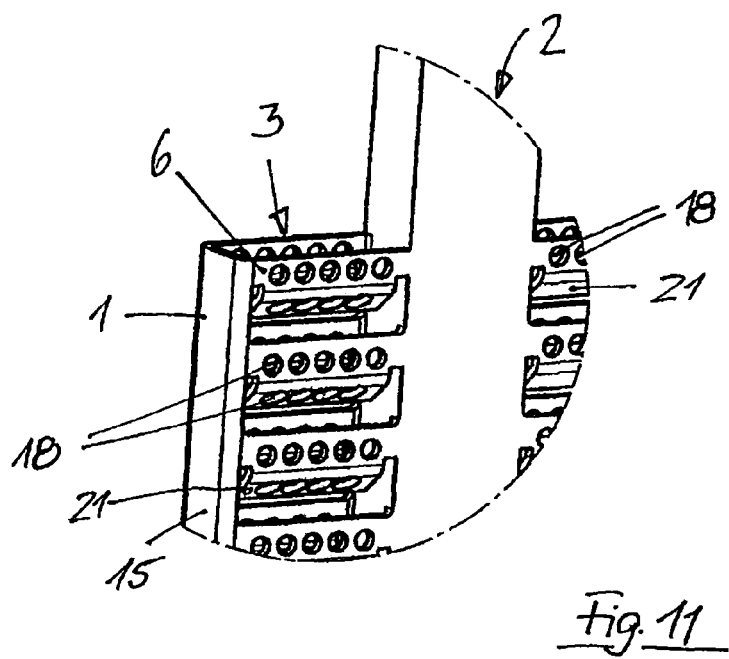

Instead of flowing in the direction of extrusion 17 that conforms with the longitudinal direction of the heating elements 9, the medium flow to which the heat generated by the PTC heating elements 11 is to be transferred passes the further chambers 3 in a direction crosswise to the direction of extrusion 17. The outer walls 6 of the further chambers 3 have been opened for that purpose. That operation is carried out preferably after insertion of the heating elements 11 into the hollow chambers 2. The operation of opening the outer walls 6 can be carried out in different ways, for example by punching out holes 18, as illustrated in FIGS. 6 and 11. Another way consists in forming the baffle 19 by making incisions in the outer walls 6 and pressing the walls inwardly, as illustrated in FIG. 7. A third way is illustrated in FIG. 8: Using a punching operation, fins 20 are formed that extend transversely to the direction of extrusion 17 and that begin in the neighborhood of the hollow chambers 2 and end a short way from the partition walls 8 and/or the end walls 15. The fins 20 are bent to the inside so that their free ends approach each other as the distance from the hollow chamber 2, from which the fins 20 extend, increases, as illustrated in FIG. 8.

Figure 9:
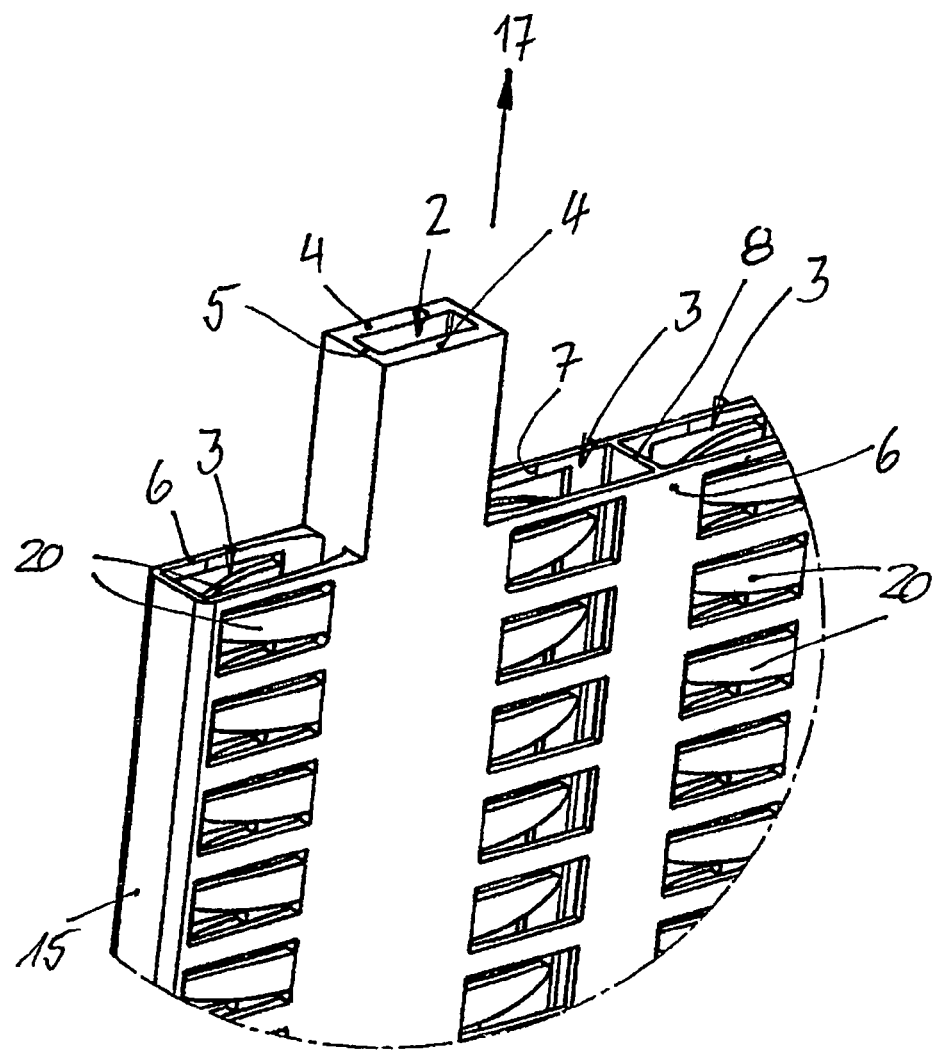

FIG. 9 shows an embodiment of the heat transmitter 1 formed by the extruded profile 1*a*, where the fins 20 are wider than in the embodiment according to FIG. 8.

Figure 10:
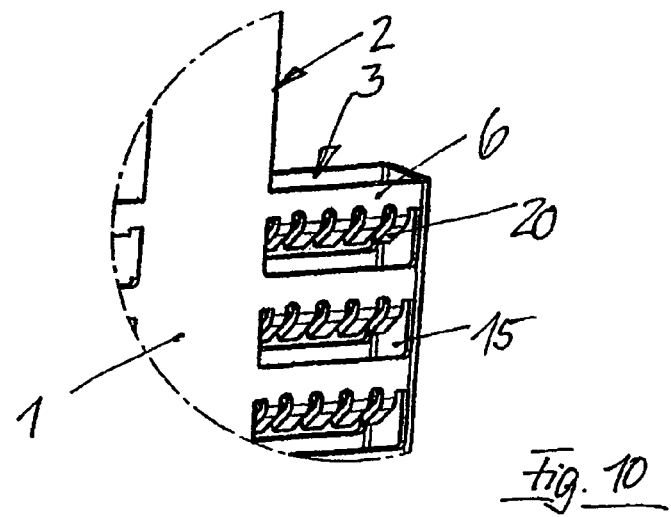

FIG. 10 shows an embodiment of the heat transmitter 1, where the outer walls 6 of the further chambers 3 are slotted to form a comb-like structure. The fins 20 so formed have been bent off into the further chambers 3.

The embodiment illustrated in FIG. 11 differs from that shown in FIG. 10 in that holes 18, instead of fins 20, are provided in the wall 6 and on tongues 21 that are formed by slitting the wall 6 and bending off the tongues into the further chambers 6.

The embodiments illustrated in FIGS. 6 to 11 have in common that the medium to be heated flows through the heat transmitter 1 in transverse direction. At the edges of the holes 18, at the cutting edges, the baffles 19 and/or fins 20, eddy currents are produced with the result that the heat exchange is considerably improved compared with prior art where the flow hits upon the surface (heat transmitter surface) of the heat transmitter 1 in tangential direction. The pressure loss encountered as the medium flows through the heat transmitter 1 in transverse direction can be varied within wide limits, and can be adapted to the particular application, by proper selection of the shape and size of the holes 18 and of the form of the cut-out baffles 19 and/or fins 20. Holes 18, baffles 19 and fins 20 may also be combined in a heat transmitter 1.

The heating apparatus illustrated in FIGS. 2 and 2*a* does not yet have any opening in the area of the further chambers 3, but has been illustrated in the condition before openings are produced in the outer walls 6 of the further chambers 3.

Together with the operation of producing the openings in the outer walls 6, the PTC heating elements 11 can be pressed together in the hollow chambers 2, especially when a progressive die is used by which the PTC heating elements 11 in the heat transmitter 1 are pressed together, the openings are formed and the outer wall 6 is pressed in inward direction, if necessary, in a single operation.

Instead of providing further chambers on the side of the hollow chambers 2, one may also connect the hollow chambers 2 by a single web, i.e. by a single wall 22, and arrange a separate wall 22*a*, which likewise does not form a further chamber, adjacent the outside of each of the two outer hollow chambers 2. The webs 22 and the outwardly projecting two separate walls 22*a* preferably have openings similar to those provided in the walls 6 of the further chambers 3 in the examples described before.

FIGS. 12 and 13 show such a heat transmitter formed from an extruded profile, which comprises, for example, three hollow chambers 2 connected by plane walls 22 in the form of webs, whereby a plane wall 22*a* is arranged adjacent each of the two outer hollow chambers 2, preferably in alignment with the plane walls 22. Such a heat transmitter can be produced very easily by extrusion. The air flow is to hit upon the plane walls 22, 22*a* in transverse direction. High heat-transfer efficiency is achieved by providing at least part of the walls 22, 22*a* with holes.

The example of a heat transmitter illustrated in FIGS. 14 and 15 differs from the embodiment according to FIGS. 12 and 13 in that the walls 22 formed as webs that connect the hollow chambers 2, as well as the walls 22*a* projecting outwardly from the two hollow chambers 2, have a plano-concave configuration and approximately the same thickness as the hollow chambers 2 in the area where they foot on the latter. The walls 22 then steadily decrease in thickness, for example along a contour in the form of an arc of a circle, having their thinnest point midway between two hollow chambers 2. The outwardly projecting walls 22*a* correspond to half a wall 22 each. The advantage of that embodiment, where the broad sides of the hollow chambers 2 form outer walls 4 or part of the outer walls of the extruded profile and where further walls 22, 22*a* of the extruded profile extend from the narrow sides of the hollow chambers 2, is that the heat produced in the hollow chambers 2 can be transmitted to the walls 22 and 22*a* more efficiently than in the example illustrated in FIGS. 12 and 13. Due to the fact that the walls decrease in thickness as the distance from the hollow chambers 2 increases, material can be saved without impairing the heat transfer. Part of the walls 22 and 22*a* is provided with holes in this case as well.

The embodiment illustrated in FIGS. 16 and 17 differs from the embodiment according to FIGS. 14 and 15 insofar as the walls 22 and 22*a*, having the form of webs, have a biconcave instead of a plano-concave configuration and are provided with holes 18 which preferably are arranged in a regular pattern and may be formed by drilling or punching.

Figure 18:
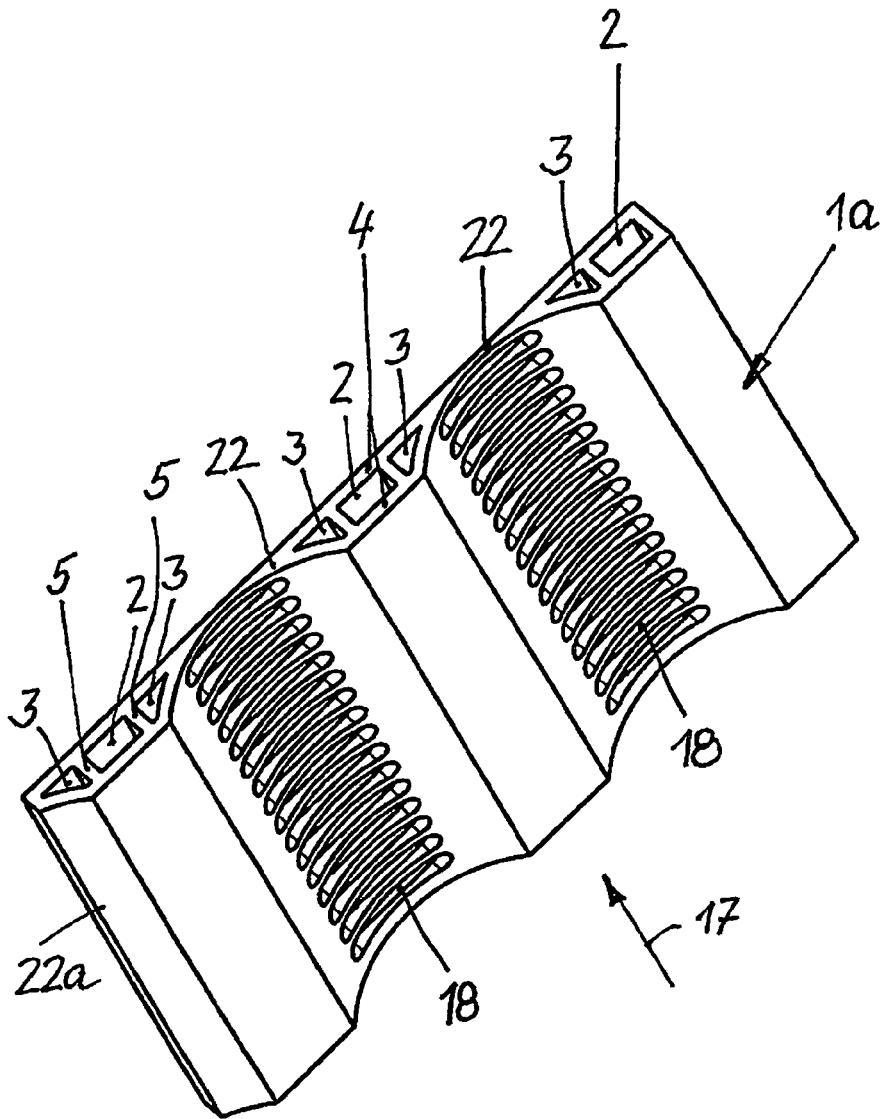
FIG. 18 shows an oblique view of a detail of another modification of the heater illustrated in FIG. 14.

The embodiment illustrated in FIG. 18 differs from that shown in FIGS. 14 and 15 in that oblong holes 18 are cut out from the walls 22 that extend between the hollow chambers 2 and that the plano-convex walls 22 and 22*a* each have a further chamber 3, extending in parallel to the hollow chamber 2, in the area where they foot on the hollow chambers 2. That further chamber 3 saves material without notably impairing the heat transfer from the walls of the hollow chamber 2 to the walls 22 and 22*a*.

Figure 20:
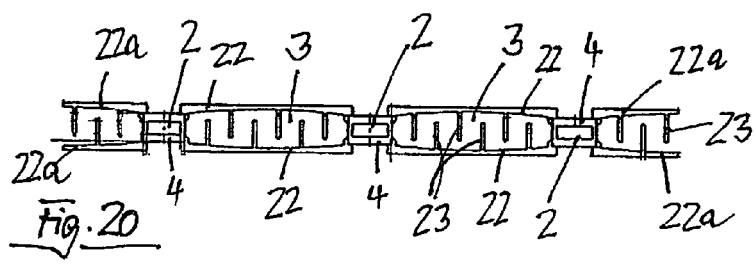
FIG. 20 shows the heat transmitter from FIG. 19, viewed in the direction of extrusion toward one of its ends.
Figure 19:
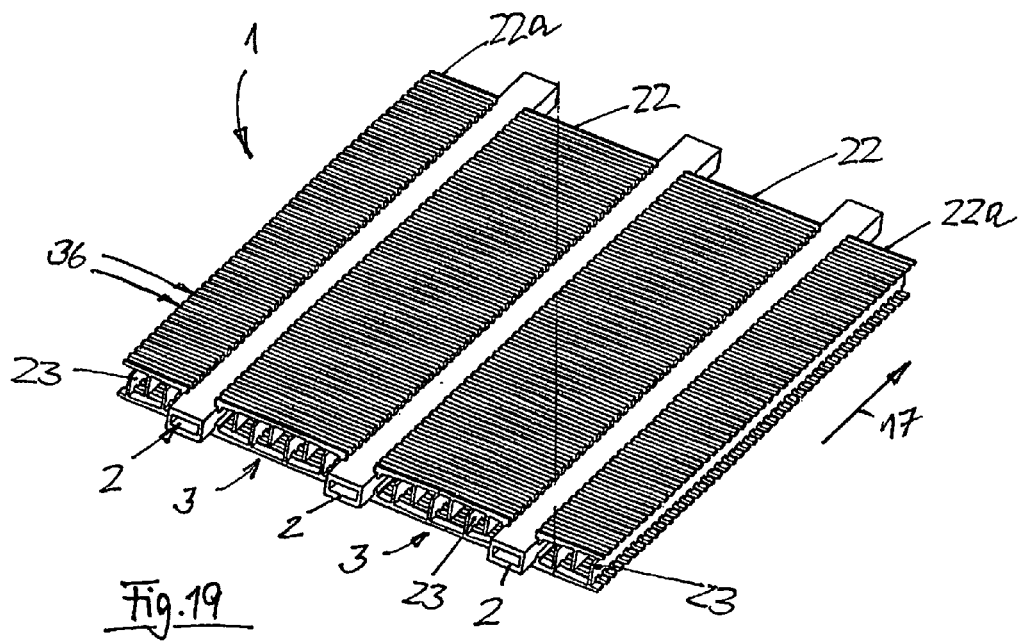
FIG. 19 shows an oblique view of a heat transmitter where four webs or walls extend from each of the hollow chambers that accommodate heating elements, which webs or walls are connected one with the other exclusively via those hollow chambers.

The embodiment illustrated in FIGS. 19 to 22 shows a heat transmitter 1 wherein three parallel rod-shaped hollow chambers 2 are each connected by two mutually opposite walls 22 of plano-concave cross-section. Starting out from each of the two outer hollow chambers 2, two mutually opposite plano-concave walls 22*a* extend to the outside in opposite directions. The plane outer surfaces of the walls 22 and 22*a* are in alignment one with the other, as illustrated in FIG. 20. The walls 22*a* conform approximately to the half-walls 22. The spacing between the opposite walls 22 and 22*a* one from the other is greater than the thickness of the extruded profile in the area of the hollow chambers 2, measured from one outside to the other outside of the walls 4. This facilitates milling slots 36 continuously into the walls 22 and 22*a*, which will be described further below.

Figures 21, 22:
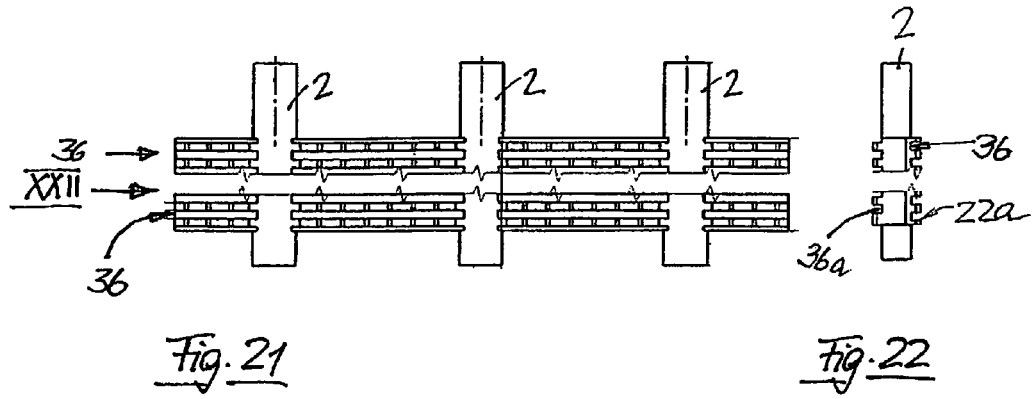
FIG. 21 shows a top view of one of the broad sides, i.e. the incident-flow side of the heat transmitter illustrated in FIG. 19.
FIG. 22 shows the view XXII on the narrow side of the heat transmitter according to FIG. 21.

Both the walls 22 and the walls 22*a* are provided with ribs 23 that extend in parallel one to the other and to the hollow chambers 2. The ribs 23 extend from the one wall 22 or 22*a* toward the opposite wall 22 or 22*a*, without however getting in contact with the latter. The arrangement of the ribs 23 is such that when regarding the cross-section of FIG. 20, a rib 23 on the one wall 22 or 22*a* follows a rib 23 on the opposite wall 22 or 22*a* so that the free space between mutually opposite walls 22 or 22*a* follows a meander-like pattern. The ribs 23 increase the heat transmitter surface. As in the example shown in FIGS. 14 and 15, the plano-concave cross-section of the walls 22 and 22*a* serves the purpose to distribute the heat coming from the hollow chambers 2 as uniformly as possible over the walls 22 and 22*a*. In addition, the walls 22 and 22*a* are slotted transversely to the direction of extrusion 17, similar to the embodiment shown in FIG. 18. The slits 36 may be mill-cut. Preferably, the arrangement of the slits 36 is such that the slits 36 on the one side of the heat transmitter 1 are staggered relative to the slits 36*a* on the other side, as illustrated in FIG. 22. Such staggered arrangement is favorable for achieving high heat-exchanging efficiency with a gaseous or liquid medium that hits upon the heat transmitter in transverse direction.

The embodiment of a heat transmitter 1 illustrated in FIGS. 23 to 25 differs from that shown in FIGS. 19 to 22 essentially in that the rod-shaped hollow chambers 2 are each connected one with the other only by a wall 22 in the form of a web and that only a single wall 22*a* extends from each of the two outer hollow chambers 2. The walls 22*a* again have half the length of the walls 22 and the plane surfaces of the plane-concave walls 22 and 22*a* are in alignment one with the other. The height of the ribs 23 that project from the concave surfaces of the walls 22, 22*a* is selected so that all of the ribs end in a plane that is in alignment with the wall 4 of the hollow chambers 2 opposite the walls 22—see FIG. 24.

The walls 22 and 22*a* are slotted from the side opposite the ribs 23. The slits 24 extend transversely to the direction of extrusion 17, have a wedge-shaped contour and may extend into the ribs 23, but not up to their tips.

Figure 28:
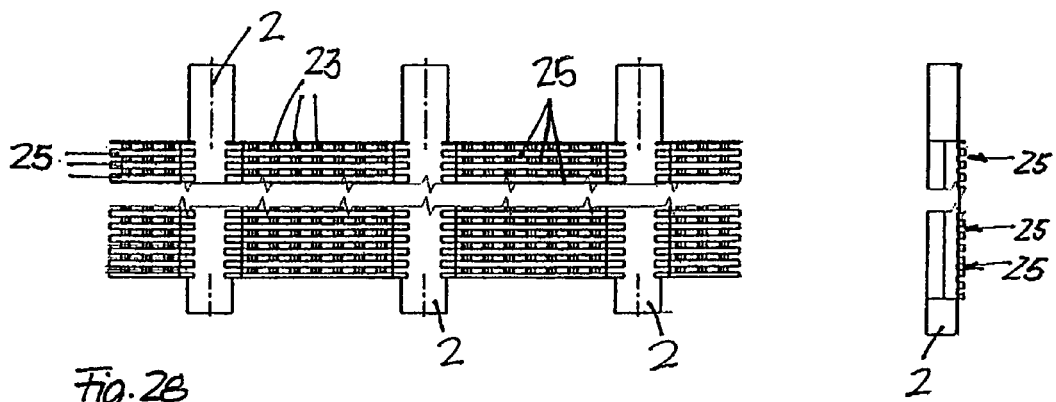
FIG. 28 shows the top view XXVIII on that broad side of the heat transmitter that is turned away from the observer's view in FIG. 26.
Figure 27:
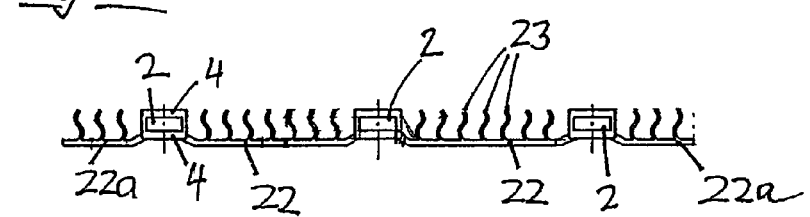
FIG. 27 shows the view XXVII on the end of the heat transmitter illustrated in FIG. 26.
Figure 26:
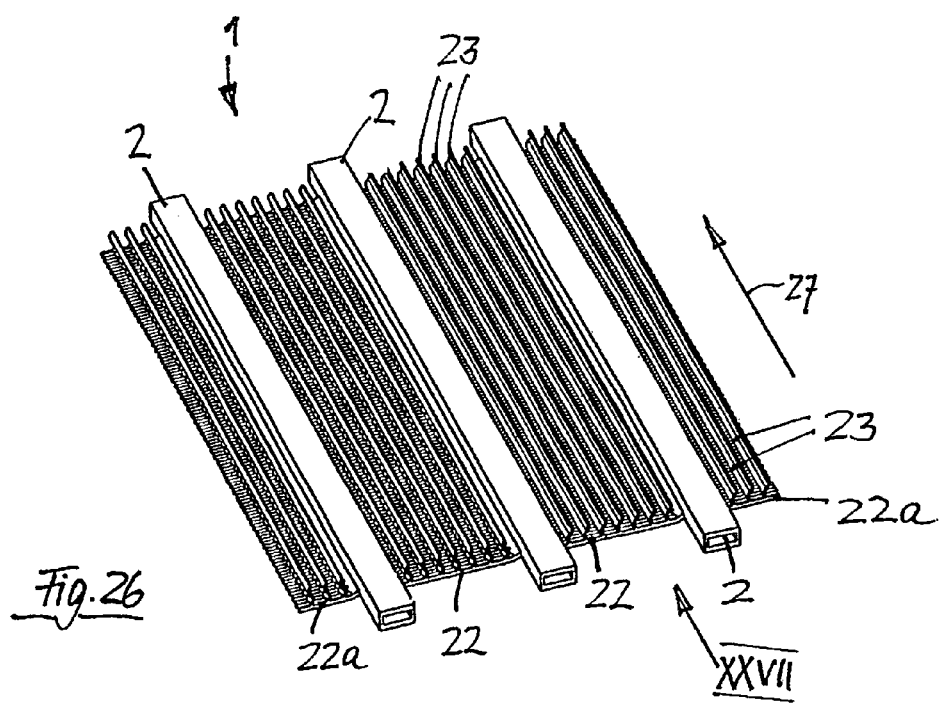
FIG. 26 shows an oblique view of another heat transmitter whose hollow chambers, accommodating PTC heating elements, for example, are connected one with the other via a web only.

The heat transmitter illustrated in FIGS. 26 to 28 differs from that shown in FIGS. 23 to 25 essentially in that the walls 22 and 22*a* have a sharp bend in the neighborhood of the hollow chambers 2—see FIG. 27—and that the ribs 23 have an S-shaped instead of a straight profile in cross-section—see FIG. 27. The walls 22 and 22*a* are slotted transversely to the direction of extrusion 17 in this embodiment as well. Just as in the example of FIGS. 23 to 25, the slits 25 extend from the side of the walls 22, 22*a* opposite the ribs 23 and may, but need not, extend into the ribs 23. In contrast to the embodiment illustrated in FIGS. 23 to 25, the slits 25 of the present example have a rectangular instead of a wedge-shaped cross-section. Similar to FIGS. 19 and 22, they may also be mill-cut.

Figure 30:
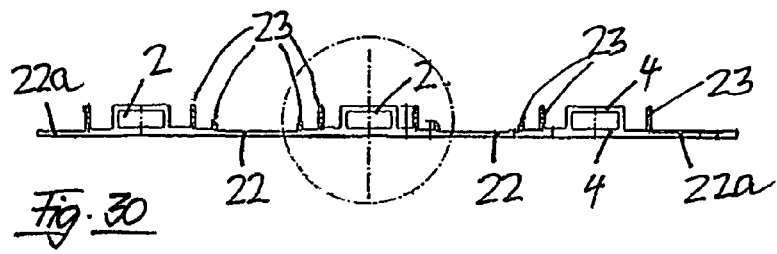
FIG. 30 shows the view XXX on the end of the heat transmitter illustrated in FIG. 29.
Figure 29:
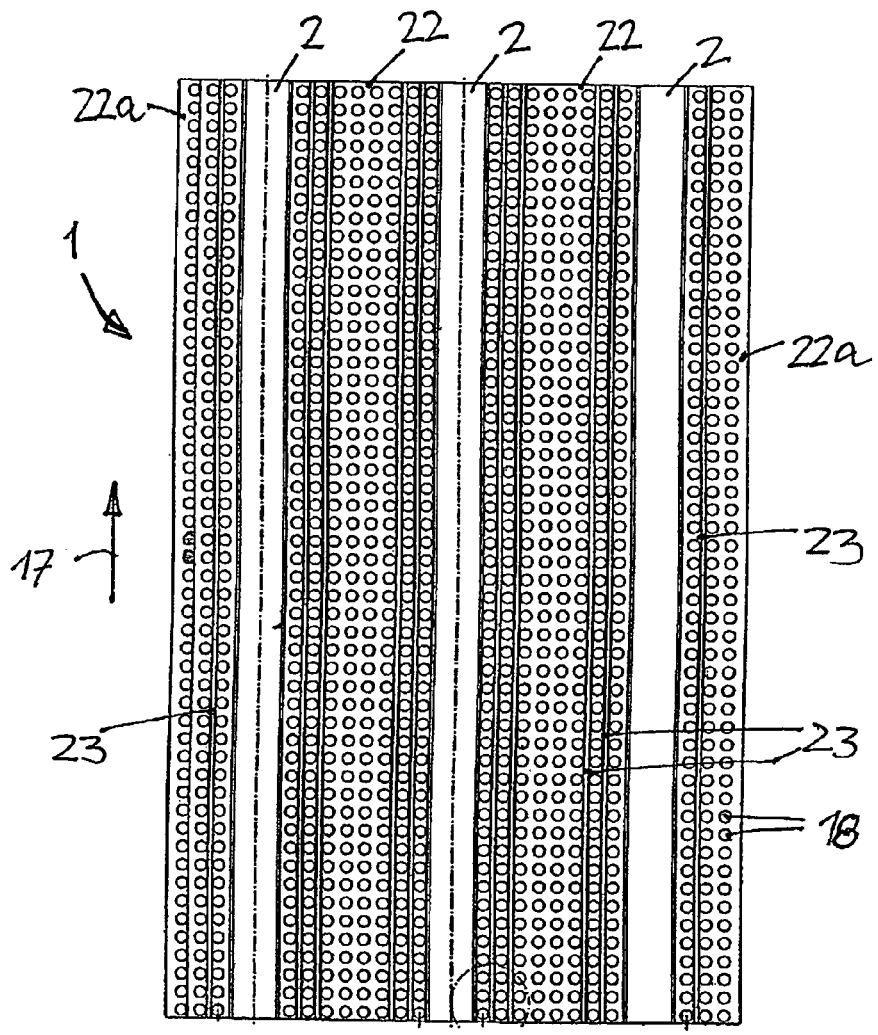
FIG. 29 shows a top view of the incident-flow side of a heat transmitter modified relative to that of FIG. 26.
Figure 31:
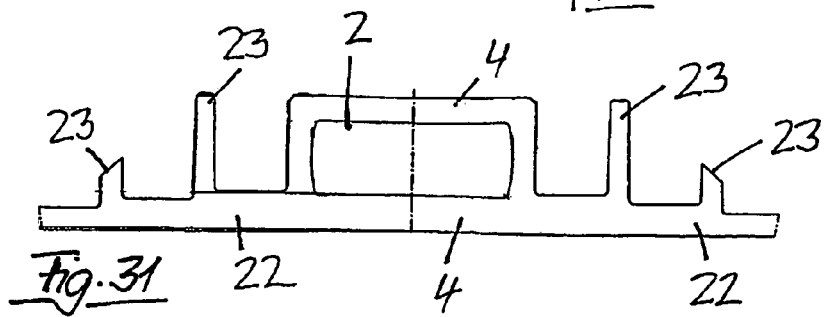
FIG. 31 shows the detail B from FIG. 30.
Figures 35, 36:
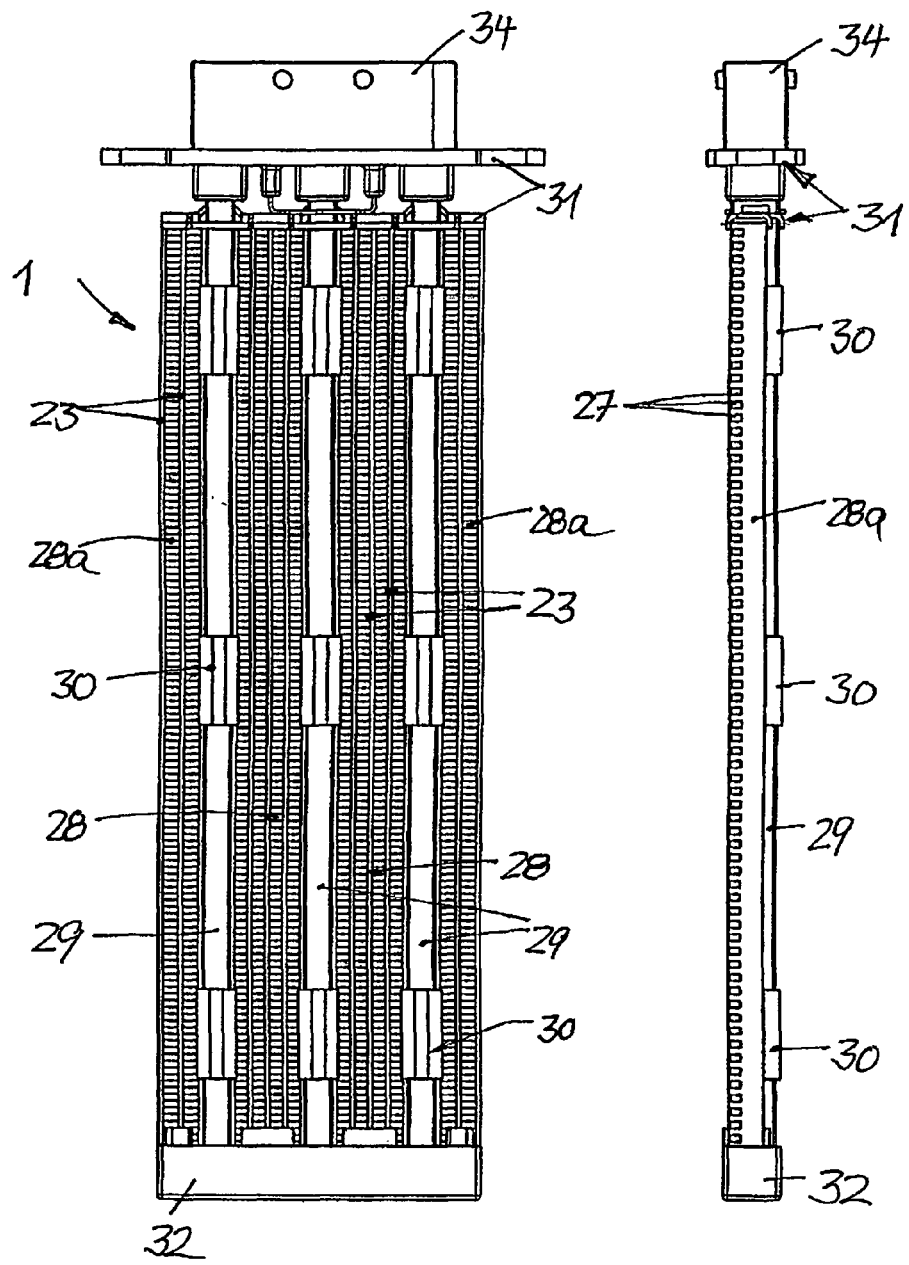
FIG. 35 shows a top view on one of the broad sides of a heating apparatus assembled from the heat transmitter profiles illustrated in FIGS. 32 to 34.
FIG. 36 shows the view XXXVI on a narrow side of the heating apparatus illustrated in FIG. 35.

The embodiment illustrated in FIGS. 29 to 31 differs from the example shown in FIGS. 23 to 25 in that the walls 22, 22*a* have a thickness that decreases in steps, beginning at the hollow chambers 2. A rib 23 is provided at each step. The height of the ribs 23 decreases as the distance from the hollow chambers 2 increases. That geometry adapts the cross-sectional profile of the heat transmitter 1 optimally to the heat flow. Since the heat flowing in the walls 22, 22*a* decreases as the distance from the hollow chambers 2 increases, the decreasing thickness of the walls 22 and 22*a* and the decreasing height of the ribs 23 result in a relatively small temperature gradient in the heat transmitter so that the heat transmitter provides special advantages with respect to efficiency and to material savings.

A further difference to the embodiment illustrated in FIGS. 23 to 25 consists in the fact that the walls 22 and 22*a* are provided with holes of preferably circular shape, rather than with slits. The holes may be produced by drilling or punching and may conveniently be arranged so as to not interfere with the ribs 23.

A further advantage of the embodiment illustrated in FIGS. 29 to 31 is that the embodiment does not have any projecting hollow rods that include the hollow chambers 2. This makes the operation needed for uncovering the projecting hollow rods, for example by milling, superfluous and correspondingly also saves material. A corresponding advantage exists in the case of the embodiments shown in FIGS. 18 and 23 to 25.

FIGS. 32 to 34 show an extruded profile 28 of comb-like cross-section as illustrated in FIG. 32. The extruded profile 28 is slotted transversely to the direction of extrusion 17, starting at the profile base 26. The slits 27 may be mill-cut and extend through the entire profile base 26 and a short way into the ribs 23 so that it is the ribs 23 that hold the transversely slit extruded profile 28 together.

FIGS. 35 to 39 show how the heating apparatus can be assembled using such extruded profiles 28. Three separate hollow chamber profiles 29 are arranged for this purpose one parallel to the other so that one extruded profile 28 according to FIGS. 32 to 34 is arranged between each profile pair. Two additional extruded profiles 28a are then placed beside the two outer hollow chamber profiles 29; these additional profiles are similar to the extruded profiles 28, extending between the hollow chamber profiles 29, but have half the width only of the extruded profiles 28. Clamps 30 that bridge one hollow chamber profile 29 each and that engage into the two neighboring extruded profiles 28 and 28a, respectively, serve to hold the extruded profiles 28, 28a and the hollow chamber profiles 29 together, which effect is complemented by holding flanges 31 and 32 that are mounted on the opposite ends of the arrangement comprising the extruded profiles 28 and 28a and the hollow chamber profiles 29.

PTC elements arranged in the hollow chamber profiles 29 are supplied with current via rigid electric supply lines 33 that project into a connector housing 34. Further, a grounding line 35, connected with the outside of the extruded profiles 28, 28a and the hollow chamber profiles 29, projects into the connector housing 34. The supply lines 33 and the grounding line 35 can be connected with the electric system of a motor vehicle, or with a control unit, via a plug-in connector, for example.

LIST OF REFERENCE NUMERALS

1. Heat transmitter
1a. Extruded profile
2. Hollow chamber
3. Further chamber
4. Outer walls of 2
5. Inner walls of 2
6. Outer walls of 3
7. Area
8. Partition wall
9. Heater
10. Mounting frame
11. Heating element
12. Supply line
13. Insulator
14. Housing
15. End wall
16. Line
17. Direction of extrusion
18. Hole
19. baffles
20. Fins
21. Tongues
22. Wall, web
22a. Wall
23. Ribs
24. Slits
25. Slits
26. Profile base
27. Slits
28. Extruded profile
28a. Extruded profile
29. Hollow chamber profile
30. Chamber
31. Mounting flange
32. Mounting flange
33. Supply line
34. Connector housing
35. Grounding line
36. Slits
36a. Slits

What is claimed is:

1. A heating apparatus, comprising:
   at least one extruded heat transmitter having heat transmitter surfaces;
   at least one longitudinal chamber formed in each transmitter along the direction of extrusion, each chamber being closed transversely to the direction of extrusion yet open in the direction of extrusion; and
   at least one heating element in disposed in each longitudinal chamber; and
   transverse openings formed through said extruded heat transmitter in a direction transverse to the direction of extrusion, the transverse openings enabling transverse gaseous or liquid medium flow through the extruded heat transmitter in the direction transverse to the direction of extrusion.

2. The heating apparatus as defined in claim 1, wherein part of the openings in the walls of the extruded transmitter are cutouts or holes.

3. The heating apparatus as defined in claim 1, wherein at least part of the openings in the walls of the extruded transmitter is formed by slits.

4. The heating apparatus as defined in claim 3, wherein portions of the walls of the extruded transmitter that are delimited by slits are bent off from the respective wall.

5. The heating apparatus as defined in claim 4, wherein the portions of the walls of the extruded transmitter that are delimited by the slits are bent into the interior of the profile.

6. The heating apparatus as defined in claim 1, wherein all walls of the extruded transmitter that are not in contact with a heating element are provided with such openings.

7. The heating apparatus as defined in claim 1, wherein the at least one chamber has a closed design viewed in a section through the extruded heat transmitter and transverse to the direction of the chambers.

8. The heating apparatus as defined in claim 1, wherein the heat transmitter forms a housing for the at least one heater.

9. The heating apparatus as defined in claim 8, wherein the at least one heater does not have a separate housing.

10. The heating apparatus as defined in claim 1, wherein the at least one heater is pressed together with the extruded heat transmitter profile or the chambers.

11. The heating apparatus as defined in claim 1, wherein a plurality of heating elements are arranged along a straight line in the heating apparatus.

12. The heating apparatus as defined in claim 1, wherein the heating elements in the at least one extruded heat transmitter are arranged in pairs one beside the other.

13. The heating apparatus as defined in claim 1, wherein all heating elements the heating apparatus are accommodated in a single heat transmitter.

14. The heating apparatus as defined in claim 1, wherein all heating elements are arranged in a single extruded heat transmitter.

15. The heating apparatus as defined in claim 1, wherein the extruded heat transmitter comprises further chambers beside the longitudinal chambers for the heater, said further chambers extending in parallel to the longitudinal chambers.

16. The heating apparatus as defined in claim 1, wherein the longitudinal chambers are directly or indirectly connected by webs that do not contain any further chambers.

17. The heating apparatus as defined in claim 16, wherein the webs are plano-concave or biconcave in cross-section.

18. The heating apparatus as defined in claim 1, wherein the extruded heat transmitter extends beyond the longitudinal chambers for the heater on both sides.

19. The heating apparatus as defined in claim 1, wherein the extruded heat transmitter has a varying wall thickness.

20. The heating apparatus as defined in claim 19, wherein the wall thickness of the outer walls of the extruded heat transmitter varies steadily between the areas of the greatest and the smallest thickness.

21. The heating apparatus as defined in claim 16, wherein a circumferential wall of the two outer longitudinal chambers transitions, on a side opposite webs, to a wall that extends from the circumferential wall of the longitudinal chambers in a direction away from the webs.

22. The heating apparatus as defined in claim 16, wherein webs and/or the walls that extend from the circumferential wall of the hollow chambers and that project to the outside are provided with ribs and/or are roughened.

23. The heating apparatus as defined in claim 22, wherein the ribs extend in the direction of extrusion.

24. The heating apparatus as defined in claim 1 wherein the longitudinal chamber has a rectangular cross-section, with two narrow sides and two broad sides, and that the broad sides form outer walls whereas further walls of the extruded profile project from the narrow sides.

25. A heating apparatus, comprising:
at least one heating element disposed in a longitudinal chamber;
at least one extruded heat transmitter having heat transmitter surfaces and forming walls of the longitudinal chamber, said longitudinal chamber being closed transversely to the direction of extrusion yet open in the direction of extrusion; and
transverse openings passing through said extruded heat transmitter in a direction transverse to the direction of extrusion, the transverse openings enabling a gas or liquid medium flow through the extruded heat transmitter passing in a direction transverse to the longitudinal chamber and direction of extrusion.

26. A heating apparatus, comprising:
at least one heating element disposed in a longitudinal chamber;
at least one extruded heat transmitter having heat transmitter surfaces that are fitted to a longitudinal housing, said longitudinal chamber being closed transversely to the direction of extrusion yet open in the direction of extrusion; and
transverse openings passing through said extruding heat transmitter in a direction transverse to the direction of extrusion, the transverse openings enabling a gas or liquid medium flow through the extruded heat transmitter passing in a direction transverse to the longitudinal housing and direction of extrusion.

\* \* \* \* \*

UNITED STATES PATENT AND TRADEMARK OFFICE
CERTIFICATE OF CORRECTION

| | |
|---|---|
| PATENT NO. | : 8,975,561 B2 |
| APPLICATION NO. | : 11/992981 |
| DATED | : March 10, 2015 |
| INVENTOR(S) | : Michael Luppold et al. |

Page 1 of 1

It is certified that error appears in the above-identified patent and that said Letters Patent is hereby corrected as shown below:

Title Page

Item (73) Assignee: "BorgWarner BERU Systems GmbH, Ludwigsburg (DE)" should read:
--BorgWarner BERU Systems GmbH, Ludwigsburg (DE); Eichenauer Heizelemente GmbH & Co. KG, Kandel (DE)--.

Signed and Sealed this
Seventeenth Day of May, 2016

Michelle K. Lee
*Director of the United States Patent and Trademark Office*